United States Patent [19]
Torii et al.

[11] Patent Number: 4,777,365
[45] Date of Patent: Oct. 11, 1988

[54] RADIATION IMAGE READ-OUT APPARATUS

[75] Inventors: Shumpeita Torii; Ryoichi Yoshimura, both of Kanagawa, Japan

[73] Assignee: Fuji Photo Film Co., Ltd., Kanagawa, Japan

[21] Appl. No.: 920,346

[22] Filed: Oct. 17, 1986

[30] Foreign Application Priority Data

| Oct. 17, 1985 | [JP] | Japan | 60-232029 |
| Oct. 17, 1985 | [JP] | Japan | 60-232030 |
| Jan. 14, 1986 | [JP] | Japan | 61-6084 |
| Jan. 28, 1986 | [JP] | Japan | 61-16074 |
| Feb. 3, 1986 | [JP] | Japan | 61-21730 |
| Feb. 10, 1986 | [JP] | Japan | 61-27353 |

[51] Int. Cl.$^4$ .................................. G01T 1/105
[52] U.S. Cl. .......................... 250/327.2; 250/484.1; 271/3.1; 271/149; 271/293
[58] Field of Search .......... 250/327.2, 484.1; 271/293, 149, 3.1

[56] References Cited

U.S. PATENT DOCUMENTS

| 3,774,902 | 11/1973 | Schulze | 271/293 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,578,582 | 3/1986 | Takano | 250/327.2 |
| 4,678,180 | 7/1987 | Tamura et al. | 271/296 |

FOREIGN PATENT DOCUMENTS

| 0125800 | 11/1984 | European Pat. Off. | 250/327.2 |
| 0011395 | 2/1981 | Japan | 250/327.2 |

*Primary Examiner*—Janice A. Howell
*Assistant Examiner*—Constantine Hannaher
*Attorney, Agent, or Firm*—Sughrue, Mion, Zinn, Macpeak & Seas

[57] ABSTRACT

An apparatus for reading out a radiation image stored on a stimulable phosphor sheet comprises a read-out section, an erasing section, and a section for releasably holding a cassette housing the stimulable phosphor sheet. The apparatus also comprises a sorter section for holding erased stimulable phosphor sheets and ejecting them one by one therefrom, a first conveyance system for receiving the stimulable phosphor sheet from the cassette holding section and conveying it to the read-out section, the erasing section and then to the sorter section, and a second conveyance system for conveying the stimulable phosphor sheet from the sorter section into the cassette. Or, the apparatus also comprises a section for releasably holding a sheet holding magazine containing many stimulable phosphor sheets, a section for holding a sheet feed magazine, the first and second conveyance systems for the cassette sheet, and a conveyance system for conveying the stimulable phosphor sheet taken out of the sheet housing magazine to the read-out section and the erasing section, and then into the sheet feed magazine.

28 Claims, 10 Drawing Sheets

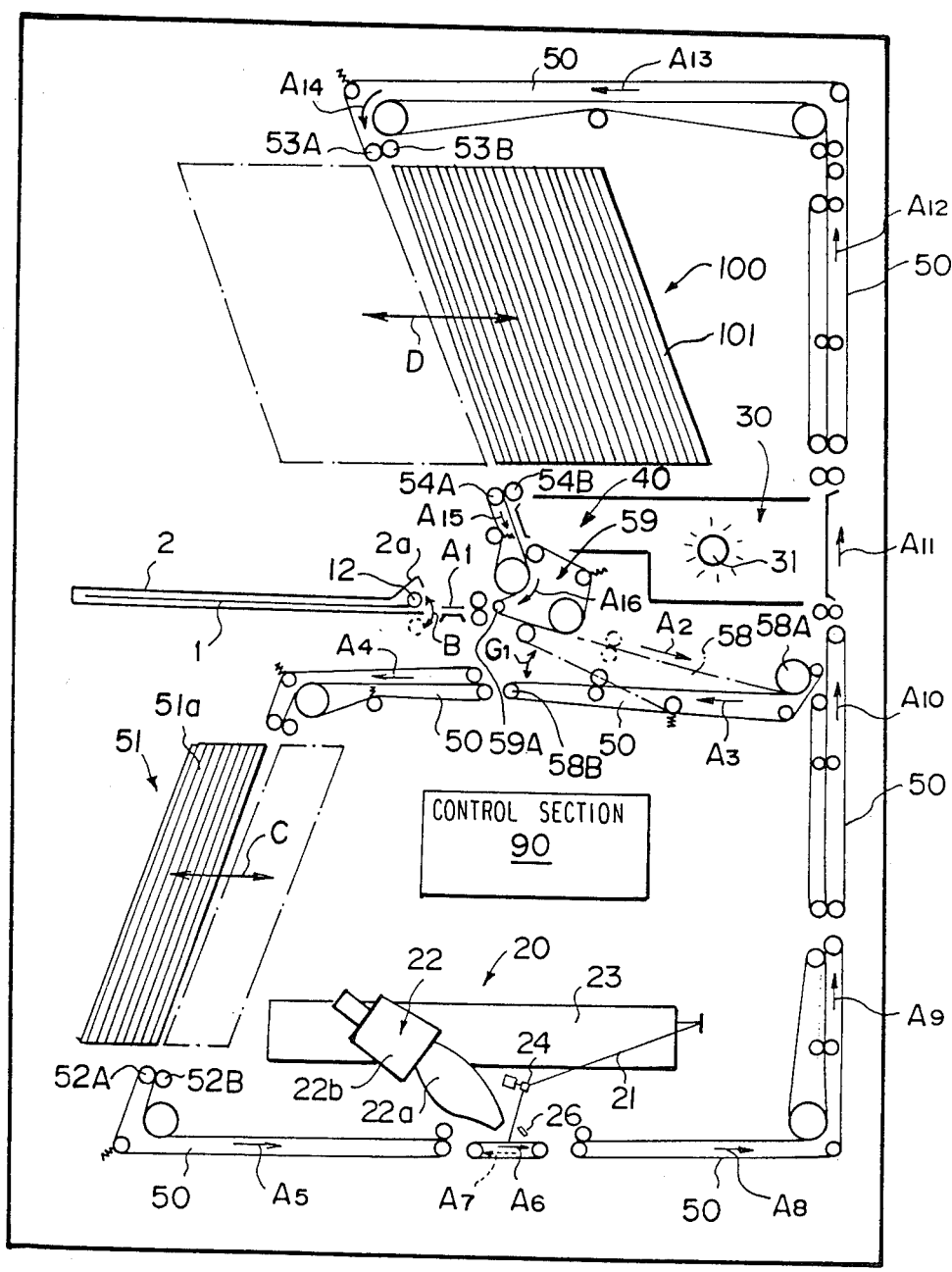
F I G. 13

RADIATION IMAGE READ-OUT APPARATUS

BACKGROUND OF THE INVENTION

1. Field of the Invention

This invention relates to a radiation image read-out apparatus for use in a radiation image recording and reproducing system. This invention particularly relates to a radiation image read-out apparatus wherein a read-out section and an erasing section are combined integrally.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to an electric image signal, and the radiation image of the object is reproduced as a visible image by use of the image signal on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

In the proposed radiation image read-out apparatus, a cassette housing a stimulable phosphor sheet carrying a radiation image stored thereon by use of an external image recording apparatus is fed to a cassette holding section, and the stimulable phosphor sheet is taken out of the cassette and sent to the read-out section for reading out the radiation image. After the image read-out is finished, the sheet is sent to the erasing section where radiation energy remaining on the sheet is erased. The erased sheet is taken out of the read-out section and reused for image recording. In general, a plurality of the erased sheets are stacked in a stacking tray inside of the read-out section, and taken out of the radiation image read-out apparatus in the form housed in the stacking tray. Since the sheets stacked in the stacking tray should be housed one by one in a cassette when they are reused for image recording, it is necessary to load the sheets one by one into a cassette prior to image recording. Therefore, a long time is taken for housing each sheet ready for image recording into a cassette and conducting image recording on the sheet, and it is not always possible to efficiently circulate and reuse the sheet. Also, though loading of the sheet into the cassette is carried out by use of a special-purpose loader or manually, the cost of the overall system increases in the case where the special-purpose loader is used, and manual loading is disadvantageous from the viewpoint of sheet processing since the sheet must be manually touched directly.

SUMMARY OF THE INVENTION

The primary object of the invention is to provide a radiation image read-out apparatus for conducting image read-out and erasing in a single apparatus, wherein a stimulable phosphor sheet ready for image recording is quickly conveyed into a cassette from which the sheet carrying a radiation image stored thereon was taken out, even though a plurality of sheets having different sizes are in use in the apparatus.

Another object of the present invention is to provide a radiation image read-out apparatus for conducting image read-out and erasing in a single apparatus, wherein sheet loading into a cassette need not be conducted outside of the apparatus, and the sheet is circulated and reused efficiently.

The specific object of the present invention is to provide a radiation image read-out apparatus for conducting image read-out and erasing in a single apparatus, wherein stimulable phosphor sheets are processed by discriminating between a sheet subjected to image recording in the form housed in a cassette and a sheet taken out of a sheet feed magazine and subjected to image recording, and the former sheet and the latter sheet are taken out of the apparatus respectively as a sheet for the cassette and a sheet for the magazine.

The present invention provides a radiation image read-out apparatus comprising:

(i) a read-out section for reading out a radiation image stored on a stimulable phosphor sheet, (ii) an erasing section for erasing radiation energy remaining on said stimulable phosphor sheet after image read-out from said stimulable phosphor sheet is finished, (iii) a cassette holding section for releasably holding a cassette capable of housing said stimulable phosphor sheet therein, and provided with a take-out means for taking said stimulable phosphor sheet out of said cassette, (iv) a sorter section for holding a plurality of the stimulable phosphor sheets, said sorter section receiving said stimulable phosphor sheet after erasing is conducted thereon at said erasing section and selectively conveying the stimulable phosphor sheets one by one out of said sorter section, and (v) a sheet conveyance means constituted by a first conveyance system for receiving said stimulable phosphor sheet conveyed from said cassette holding section, conveying said stimulable phosphor sheet to said read-out section and said erasing section, and then conveying said stimulable phosphor sheet into said sorter section, and a second conveyance system for receiving said stimulable phosphor sheet conveyed out of said sorter section and conveying said stimulable phosphor sheet into the cassette held at said cassette holding section.

The present invention also provides a radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a cassette holding section for releasably holding a cassette capable of housing said stimulable phosphor sheet therein, and provided with a take-out means for taking said stimulable phosphor sheet out of said cassette,
(iv) a sheet housing magazine holding section for releasably holding a sheet housing magazine capable of housing a plurality of the stimulable phosphor sheets therein, and provided with a take-out means for taking said stimulable phosphor sheets one by one out of said sheet housing magazine,
(v) a sheet feed magazine holding section for releasably holding a sheet feed magazine capable of housing a plurality of the stimulable phosphor sheets,
(vi) a cassette sheet conveyance means constituted by a first conveyance system for receiving said stimulable phosphor sheet taken out of said cassette and conveying said stimulable phosphor sheet to said read-out section and said erasing section, and a second conveyance system for conveying said stimulable phosphor sheet from said erasing section to said cassette holding section, and
(vii) a magazine sheet conveyance means for receiving said stimulable phosphor sheet taken out of said sheet housing magazine, conveying said stimulable phosphor sheet to said read-out section and said erasing section, and thereafter conveying said stimulable phosphor sheet into said sheet feed magazine.

The present invention further provides a radiation image read-out apparatus comprising:
(i) a read-out section for reading out a radiation image stored on a stimulable phosphor sheet,
(ii) an erasing section for erasing radiation energy remaining on said stimulable phosphor sheet after image read-out from said stimulable phosphor sheet is finished,
(iii) a cassette holding section for releasably holding a cassette capable of housing said stimulable phosphor sheet therein, and provided with a take-out means for taking said stimulable phosphor sheet out of said cassette, and
(iv) a sheet conveyance means for conveying said stimulable phosphor sheet along an approximately loop-like conveyance path for the purpose of receiving said stimulable phosphor sheet conveyed from said cassette holding section, conveying said stimulable phosphor sheet to said read-out section and said erasing section in this order, and then conveying said stimulable phosphor sheet passing through said erasing section into said cassette at said cassette holding section,
said cassette holding section being provided at a position inward of said approximately loop-like conveyance path of said sheet conveyance means.

With the first mentioned radiation image read-out apparatus in accordance with the present invention, when a stimulable phosphor sheet carrying a radiation image stored thereon is taken out by the take-out means from the cassette held at the cassette holding section, one of the sheets held at the sorter section is selected and conveyed out of the sorter section, and conveyed by the second conveyance system into the cassette. The cassette housing the sheet may immediately be taken out of the cassette holding section and sent to an external recording apparatus for conducting image recording on the sheet housed in the cassette. Therefore, sheet loading into the cassette outside of the read-out apparatus becomes unnecessary, and it is possible to circulate and reuse the sheet efficiently. Also in the case where cassettes which house sheets having different sizes are sequentially fed to the cassette holding section, sheets having different sizes may be held in advance at the sorter section, and a sheet having the size corresponding to the cassette fed to the cassette holding section may be selected and conveyed into the cassette. Accordingly, it is possible to improve the sheet circulation and reuse efficiency.

With the last mentioned radiation image read-out apparatus in accordance with the present invention, the same effects as mentioned above are obtained. Further, since the sheet feed magazine holding section and the magazine sheet conveyance means are provided, a sheet taken out of the sheet housing magazine may be conveyed by the magazine sheet conveyance means into the sheet feed magazine held at the sheet feed magazine holding section. Therefore, it is possible to take sheets out of the read-out apparatus by reliably discriminating between the sheet subjected to image recording in the form housed in the cassette and the sheet taken out of the sheet feed magazine and subjected to image recording. The cassette sheet conveyance means and the magazine sheet conveyance means need not necessarily be formed independently of each other, and a part thereof may be formed commonly insofar as sheet conveyance is effected by discriminating the sheets as mentioned above.

With the last mentioned radiation image read-out apparatus in accordance with the present invention, since the cassette holding section is provided at a position inward of the approximately loop-like conveyance path, the space of the cassette holding section may be accommodated within the space inward of the conveyance path, and the cassette holding section does not project out of the apparatus. Therefore, it is possible to minimize the size of the overall apparatus. By "approximately loop-like conveyance path" is meant that major portions of the conveyance path are connected in the loop form. The approximately loop-like conveyance path is not necessarily limited to a circular shape, and may include a switch-back conveyance section.

BRIEF DESCRIPTION OF THE DRAWINGS

FIG. 13 is a schematic side view showing a still further embodiment of the radiation image read-out apparatus in accordance with the present invention.

DESCRIPTION OF THE PREFERRED EMBODIMENTS

The present invention will hereinbelow be described in further detail with reference to the accompanying drawings.

Figure 1:
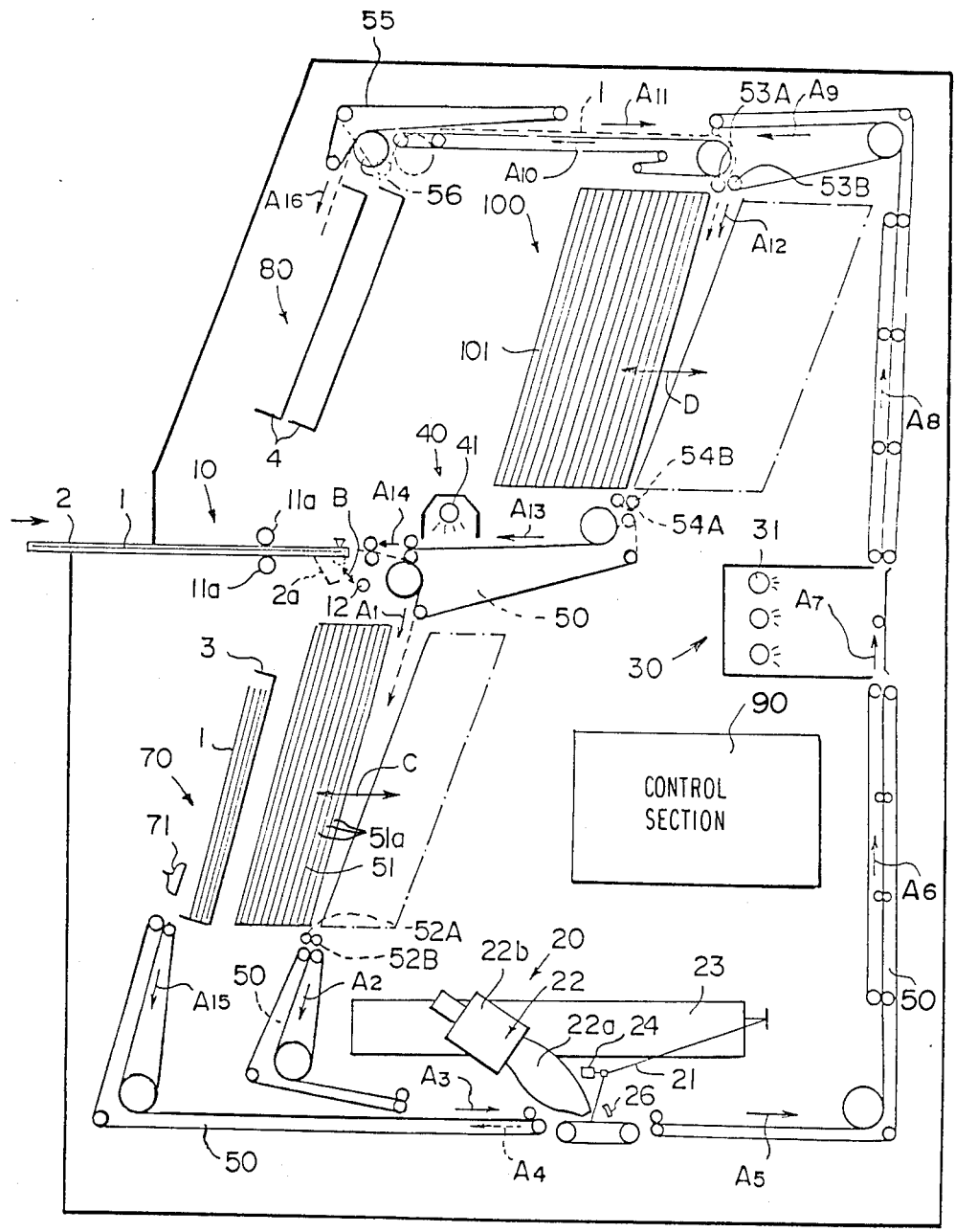
FIG. 1 is a schematic side view showing an embodiment of the radiation image read-out apparatus in accordance with the present invention.

Referring to FIG. 1, an embodiment of the radiation image read-out apparatus in accordance with the present invention is provided with a cassette holding section 10 for releasably holding a cassette 2 capable of housing a stimulable phosphor sheet (hereinafter simply referred to as a sheet) 1 therein, a read-out section 20 for reading out a radiation image stored on the sheet 1, and an erasing section 30 for erasing radiation energy remaining on the sheet 1 after image read-out is conducted thereon. The sheet 1 is subjected to image recording in an external image recording apparatus (not shown) in the form housed in the cassette 2, and the cassette 2 housing the sheet 1 is fed to the cassette holding section 10. The cassette 2 is light-tight so that the sheet 1 is prevented from exposure to external light when it is exposed to a radiation to have a radiation image recorded thereon. The cassette 2 is provided with an operable cover member 2a at a part of the bottom. When the cassette 2 is fed via guide rollers 11a, 11a into the cassette holding section 10, the cover member 2a is maintained in the closed position as indicated by the solid line. When feeding of the cassette 2 to the cassette holding section 10 is finished, the cover member 2a is opened downwardly as indicated by the broken line so that an end portion of the sheet 1 housed in the cassette 2 is exposed. A conveying roller 12 acting as a sheet take-out means is provided for movement in the direction as indicated by the arrow B in the vicinity of the leading end of the cassette 2 held at the cassette holding section 10. When the cover member 2a of the cassette 2 is opened, the conveying roller 12 is moved to the position as indicated by the broken line, rotated while pushing the sheet 1 against an upper inner wall of the cassette 2, and takes the sheet 1 out of the cassette 2. The sheet 1 is housed in the cassette 2 so that the front surface provided with a stimulable phosphor layer faces up.

This embodiment is also provided with a sheet conveyance means 50 comprising endless belts, rollers, guide plates or the like, for receiving the sheet 1 taken out of the cassette 2 and conveying it to the read-out section 20 and the erasing section 30. The sheet 1 taken out by the conveying roller 12 from the cassette 2 is conveyed by the sheet conveyance means 50 in the direction as indicated by the arrow A1. A stack section 51 comprising a plurality of sheet housing compartments 51a, 51a, ... for respectively housing a single sheet 1 therein is disposed at the sheet conveyance means 50 between the cassette holding section 10 and the read-out section 20. The stack section 51 temporarily houses the sheet 1 conveyed out of the cassette holding section 10, and has a configuration similar to a sorter section 100 described later. The sheet 1 conveyed in the direction as indicated by the arrow A1 as mentioned above is introduced into one of the sheet housing compartments 51a, 51a, ... of the stack section 51 moveable in the direction as indicated by the arrow C. The upper end portion of the sheet housing compartment 51a for receiving the sheet 1 is opened when the sheet 1 is conveyed thereinto, and is closed when the sheet 1 has been conveyed thereinto. When the sheet 1 is conveyed out of the stack section 51, the stack section is moved in the direction as indicated by the arrow C until the predetermined sheet housing compartment 51a containing the sheet 1 which is to be conveyed therefrom is positioned above conveying rollers 52A, 52B provided under the stack section 51, and the lower end of the sheet housing compartment 51a is opened to transfer the sheet 1 to the conveying rollers 52A, 52B. The sheet 1 is then conveyed by the sheet conveyance means 50 in the direction as indicated by the arrow A2 into the read-out section 20.

At the read-out section 20, the sheet 1 carrying a radiation image stored thereon is scanned with stimulating rays 21 such as a laser beam which cause the sheet 1 to emit light in proportion to the stored radiation energy, and the emitted light is photoelectrically detected by a photoelectric read-out means 22 constituted by a photomultiplier or the like to obtain an electric image signal for use in reproduction of a visible image. Reference numeral 23 denotes a stimulating ray source, and reference numeral 24 denotes a light deflector such as a galvanometer mirror. Reference numeral 26 designates a reflection mirror for reflecting the light emitted by the sheet 1 towards a light guide member 22a of the photoelectric read-out means. The light guide member 22a guides the light through total reflection therein up to a photodetector 22b constituted by a photomultiplier or the like.

The sheet 1 sent to the read-out section 20 is conveyed by the sheet conveyance means 50 in the direction as indicated by the arrow A3, and the whole surface of the sheet 1 is scanned two-dimensionally by the stimulating rays 21 deflected approximately normal to the conveyance direction. The light emitted by the sheet 1 during the scanning is detected by the photodetector 22b via the light guide member 22a. Image read-out is conducted in this manner.

As for the radiation image read-out, there has heretofore been known a method wherein preliminary read-out for approximately ascertaining the radiation image store on the sheet 1 is conducted prior to the aforesaid image read-out (final read-out) for obtaining an electric image signal for use in reproduction of a visible image, image read-out conditions for the final read-out or the like are adjusted based on the information obtained by the preliminary read-out, and the final read-out is carried out by use of the adjusted read-out conditions.

As disclosed, for example, in Japanese Unexamined Patent Publication No. 58(1983)-67240, the preliminary read-out may be conducted by scanning the sheet 1 with stimulating rays having stimulation energy of a level lower than the level of the stimulation energy of the stimulating rays used in the final read-out, and detecting the light emitted by the sheet 1 during the scanning by a photoelectric read-out means.

The read-out section 20 may be constituted to conduct only the final read-out or both the preliminary read-out and the final read-out. For example, the preliminary read-out may be conducted by conveying the sheet 1 in the direction as indicated by the arrow A3, and the final read-out may then be carried out by reversely conveying the sheet 1 in the direction as indicated by the arrow A4 to the read-out start position, and then conducting the final read-out while the sheet 1 is again conveyed in the direction as indicated by the arrow A3. The optical members at the read-out section 20 are not limited to those mentioned above. For example, a long photomultiplier may be disposed along the main scanning line as the photoelectric read-out means, and the light emitted by the sheet 1 may be detected thereby without using the light guide member 22a.

Though a comparatively long time is taken for conducting the image read-out at the read-out section 20, since this embodiment is provided with the stack section 51, it is possible to convey the sheets 1, 1, . . . carrying a radiation image stored thereon sequentially into the stack section 51 while image read-out is conducted for one sheet 1, and thereby to process the sheets 1, 1, . . . very efficiently. It it also possible to preferentially send a specific sheet 1 among the sheets 1, 1, . . . housed in the stack section 51 to the read-out section 20 for preferentially conducting image read-out from the specific sheet 1. The stack section 51 need not necessarily be provided in the case where a cassette 2 housing a sheet 1 is always fed to the cassette holding section 10 after image read-out from a preceding sheet 1 is finished at the read-out section 20, and the sheet 1 taken out of the cassette 2 need not wait before being sent to the read-out section 20.

After image read-out from the sheet 1 is finished at the read-out section 20, the sheet 1 is conveyed by the sheet conveyance means 50 in the directions as indicated by the arrows A5 and A6 to the erasing section 30.

At the erasing section 30, radiation energy remaining on the sheet 1 after the image read-out is erased. Specifically, a part of the radiation energy stored on the sheet 1 at the image recording step remains stored thereon after the image read-out. In order to reuse the sheet 1, the residual radiation energy is erased at the erasing section 30. For this purpose, any erasing method may be used. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the sheet 1 is exposed to the erasing light emitted by the erasing light sources 31, 31, . . . for releasing the residual radiation energy from the sheet 1 while the sheet 1 is conveyed in the direction as indicated by the arrow A7.

After erasing of the sheet 1 is finished at the erasing section 30, the sheet 1 is conveyed in the direction as indicated by the arrow A8 and then in the directions as indicated by the arrows A9 and A10. After the sheet 1 is conveyed in the direction as indicated by the arrow A10 up to the position indicated by the broken line, the sheet 1 is switched back and reversely conveyed in the direction as indicated by the arrow A11 and then in the direction as indicated by the arrow A12 into the sorter section 100. A first conveyance system of the sheet conveyance means 50 is constituted by the members between the reception of the sheet 1 conveyed out of the cassette holding section 10 and conveyance of the sheet 1 into the sorter section 100. The sorter section 100 has a configuration similar to the stack section 51. The sorter section 100 is provided with a plurality of sheet housing compartments 101, 101, . . . , and moved in the direction as indicated by the arrow D for receiving the sheet 1 into either one of the sheet housing compartments 101, 101, . . . . Before the sheet 1 is conveyed into one of the sheet housing compartments 101, 101, . . ., a plurality of sheets 1, 1, . . . have already been housed in the other compartments 101, 101, . . . . The configuration and function of the sorter section 100 will hereinbelow be described in detail with reference to FIGS. 1 to 5.

Figure 2:
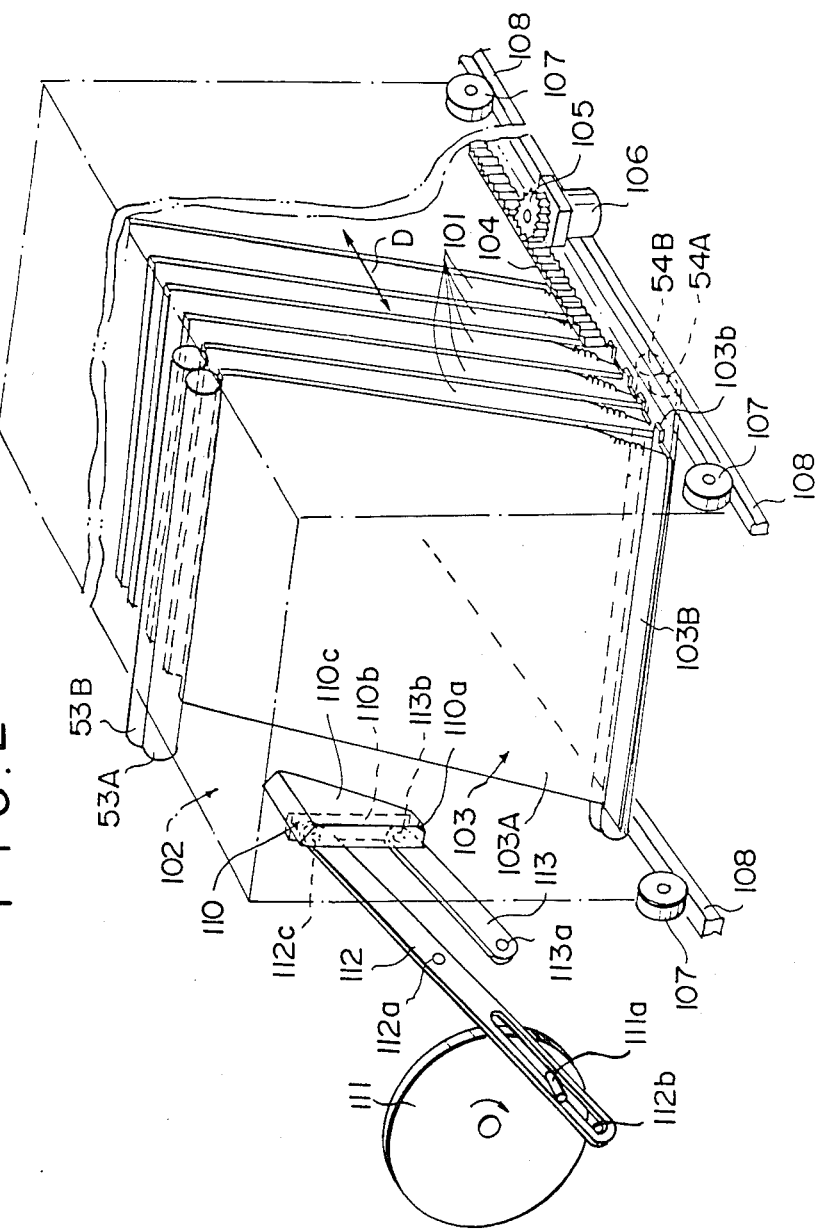
FIG. 2 is a perspective view showing the configuration of the sorter section in the embodiment of FIG. 1.
Figure 3:
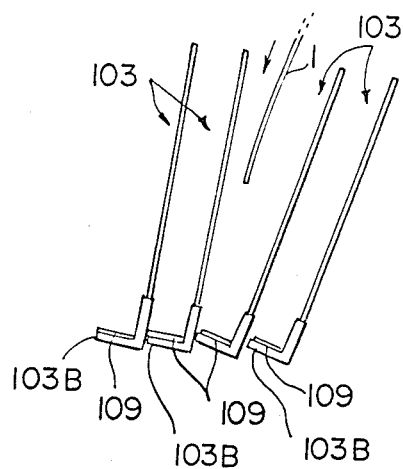
FIG. 3 is a side view showing sheet conveyance into a tray at the sorter section of FIG. 2, FIGS. 4A, 4B and 4C are explanatory views showing the function of the guide member at the sorter section of FIG. 2.
Figure 5:
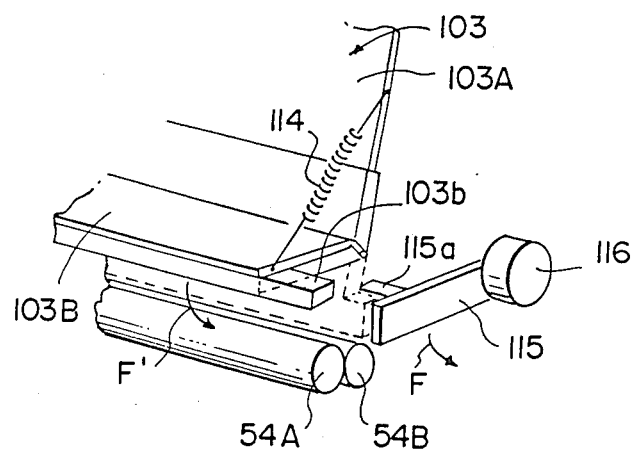
FIG. 5 is a perspective view showing the take-out mechanism for taking the stimulable phosphor sheet out of the sorter section of FIG. 2.

As shown in FIG. 2, at the sorter section 100, a plurality of trays 103, 103, . . . for holding a single sheet 1 respectively are disposed in equally spaced and parallel relation to each other in a case 102 constituted by four side walls. The trays 103, 103, . . . are inclined to face up obliquely. Each of the trays 103, 103, . . . is constituted by a supporting plate 103A and a bottom plate 103B approximately normal to the supporting plate 103A, and the space defined by the supporting plate 103A and the bottom plate 103B constitutes one sheet housing compartment 101. The left end portion of the supporting plate 103A is slanted so that the width of the supporting plate 103A becomes narrow towards the upper side, whereby the space between the trays 103, 103, . . . may be increased by a guide member 110 as described in detail later. For moving the case 102 provided with the trays 103, 103, . . . , a pinion 105 is engaged with a rack 104 secured to one side wall of the case 102 and is rotated by a motor 106. As a result, wheels 107, 107, . . . , provided at the lower end of the case 102 move along rails 108, 108 to move the case 102 in the direction as indicated by the arrow D. In FIG. 1, the positions of the sheet housing compartments 101, 101, . . . with the case 102 positioned at the leftmost side are shown, and the sheet housing compartments 101, 101, . . . are moveable in the form housed in the case 102 up to the position indicated by the chain line. As the case 102 is moved in the direction as indicated by the arrow D, a different tray 103 comes to a position under feed rollers 53A, 53B for conveying the sheet 1 into the sorter section 100 as shown in FIGS. 1 and 2. The feed rollers 53A, 53B conveys the sheet 1 into the tray 103 positioned thereunder. As shown in FIG. 3, when the sheet 1 leaves the feed rollers 53A, 53B, it falls along the supporting plate 103A and thus into the tray 103. A cushioning material 109 for absorbing the shock of the falling sheet 1 is secured to the upper surface of the bottom plate 103B of each tray 103. Also, as shown in FIG. 3, the inclination of the tray 103 for receiving the sheet 1 is changed so that the space between said tray 103 and the adjacent tray 103 is increased for facilitating the falling of the sheet 1 into said tray 103. In order to deflect the tray 103 in this manner, the guide member 110 is provided on the lateral side of the case 102. The guide member 110 is in the form of a wedge having a thickness gradually increasing upwardly, and the lower end portion is chamfered to form a chamfered surface 110a. The guide member 110 contacts the slanted left end portion of the supporting plate 103A of the tray 103 for receiving the sheet 1, and is inserted into the sheet housing compartment 101 to widen the space thereof. Since sheets 1, 1, . . . having different sizes may be conveyed into the trays 103, 103, . . . , the guide member 110 also adjusts the position of the sheet 1 in the tray 103 in accordance with the size of the sheet 1 conveyed into the tray 103. The drive mechanism and the action of the guide member 110 will now be described with reference to FIGS. 2 and 4A–4C.

Figure 4A:
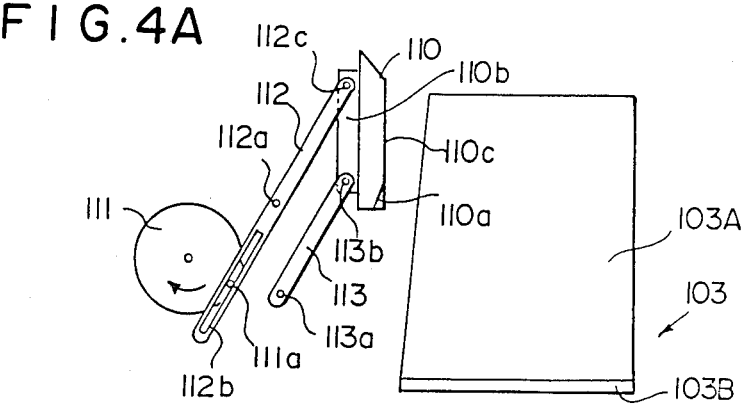
Figure 4B:
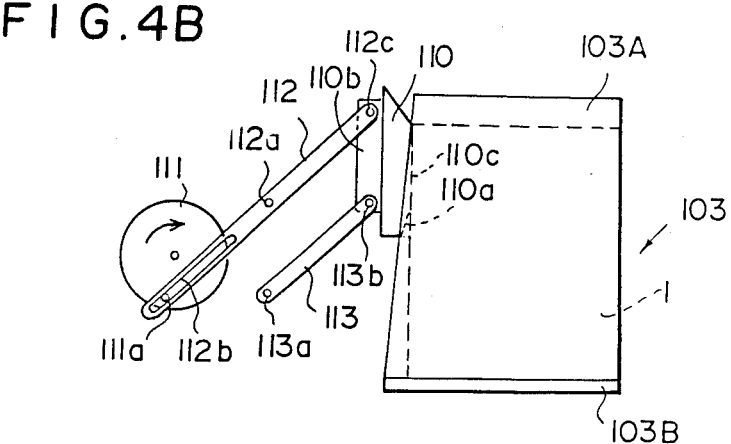
Figure 4C:
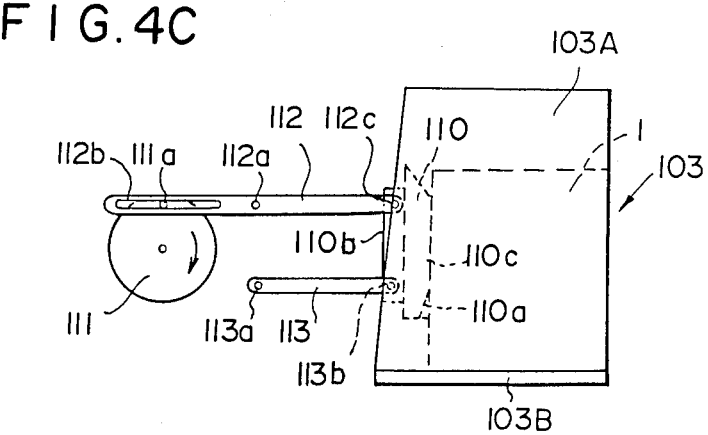

FIGS. 4A–4C shows the tray 103 and the guide member 110 as viewed from a direction parallel to the movement direction of the case 102 as indicated by the arrow D.

The guide member 110 is supported on a supporting member 110b. A swing arm 112 is rotatably supported at a center portion 112a, and has a long hole 112b provided at one end portion and engaged with a pin 111a secured to a rotatable plate 111. The other end 112c of the swing arm 112 is mounted on the upper portion of the supporting member 110b for the guide plate 110. A link member 113 is rotatably supported at one end portion 113a, and has the other end portion 113b mounted on the lower portion of the supporting member 110b. The rotatable plate 111 is rotated by a drive means (not shown) such as a motor in the direction as indicated by the arrow E. As shown in FIG. 4A, when the case 102 is moved as mentioned above, the guide member 110 is retracted from the tray 103. When the case 102 is stopped at the position for introducing the sheet 1 into the tray 103 and the tray 103 for receiving the sheet 1 is positioned on the lateral side of the guide member 110, the rotatable plate 111 is rotated clockwise by a predetermined angle, so that the guide member 110 pushes the tray 103, widens the space of the sheet housing compartment 101, and advances up to the position shown in FIG. 4B. At the position shown in FIG. 4B, the guide member 110 pushes the tray 103 to widen the space between said tray 103 and a tray 103 adjacent thereto, thereby facilitating introduction of the sheet 1, and to adjust the position of the introduced sheet 1. Specifically, a side surface 110c of the guide member 110 contacts the side edge of the sheet 1 and adjusts the position of the sheet 1 in the width direction in accordance with the size of the sheet 1. In the case where the size of the sheet 1 is comparatively large, the guide member 110 is stopped at the position shown in FIG. 4B. As shown in FIG. 4C, in the case where the size of the sheet 1 introduced into the tray 103 is comparatively small, the guide member 110 advances more inwardly of the tray 103. While the space between the tray 103 and a tray 103 adjacent thereto is widened by the guide member 110, the sheet 1 is conveyed into said tray 103 by being guided along the side surface 110c of the guide member 110, and the position of the sheet 1 is adjusted by the guide member 110.

After the sheet 1 is conveyed into the tray 103, the rotatable plate 111 is rotated counter-clockwise to return the guide member 110 to the position shown in FIG. 4A, and the tray 103 housing the sheet 1 is returned to the position parallel to the adjacent tray 103.

Conveying of the erased sheet 1 into the sorter section 100 is conducted in the manner as mentioned above. The sheets 1, 1, . . . housed in the respective trays 103, 103, . . . at the sorter section 100 are selected one by one, conveyed out of the sorter section 100, and introduced into the empty cassette 2 held at the cassette holding section 10. The sheet conveyance into the cassette 2 is conducted immediately after a sheet 1 suitable for the cassette 2 is selected from among the sheets 1, 1, . . . housed in the sorter section 100 and a sheet 1 is taken out of the cassette 2. As shown in FIG. 1, a pair of conveying rollers 54A, 54B are provided under the sorter section 100 for receiving the sheet 1 ejected from the sorter section 100 and conveying it out of the sorter section 100. The case 102 is moved in the direction as indicated by the arrow D so that the tray 103 housing the selected sheet 1 comes to the position above the conveying rollers 54A, 54B. Ejection of the sheet 1 from the sorter section 100 after the case 102 is thus positioned will now be described with reference to FIG. 5.

The bottom plate 103B of the tray 103 is connected to the supporting plate 103A by a spring 114, and is normally at the position approximately perpendicular to the supporting plate 103A. A protrusion 103b is formed at the side end of the bottom plate 103B. A lever 115 provided with a protrusion 115a and rotatable in the direction as indicated by the arrow F by a drive means 116 constituted by a rotary solenoid or the like is disposed in the vicinity of the conveying rollers 54A, 54B. When the sheet 1 is ejected from the tray 103, the protrusion 115a of the lever 115 is engaged with the protrusion 103b, and the lever 115 is rotated in the direction as indicated by the arrow F to extend the spring 114 and rotate the bottom plate 103B in the direction as indicated by the arrow F' up to the position lying approximately on the same plane as the supporting plate 103A as indicated by the broken line in FIG. 5. When the bottom plate 103B is rotated to said position, the sheet 1 falls by its weight out of the tray 103. The conveying rollers 54A, 54B grasp the leading end of the falling sheet 1, and convey the sheet 1 out of the sorter section 100. When the conveyance of the sheet 1 out of the sorter section 100 is finished, the lever 115 is returned to the position indicated by the solid line, and the bottom plate 103B is returned to the position indicated by the solid line by the returning force of the spring 114.

As shown in FIG. 1, the sheet 1 ejected from the sorter section 100 is conveyed by the sheet conveyance means 50 in the direction as indicated by the arrow A13, made to pass under an auxiliary erasing section 40 provided in the conveyance path, and further conveyed in the direction as indicated by the arrow A14 into the cassette 2. A second conveyance system of the sheet conveyance means 50 is constituted by the members between reception of the sheet 1 conveyed out of the sorter section 100 and conveyance thereof into the cassette 2. In the course of conveying the sheet 1 into the cassette 2, the conveying roller 12 is disposed at the position indicated by the broken line, and is rotated reversely to the rotating direction at the time of conveying the sheet 1 out of the cassette 2, thereby to convey the sheet 1 into the cassette 2. The sheet 1 conveyed into the cassette 1 is exposed to erasing light emitted by an erasing light source 41 at the auxiliary erasing section 40 since it may occur that the sheet 1 has been maintained at the sorter section 100 before the cassette 2 is fed to the cassette holding section 10 and a long time has elapsed after the sheet 1 was subjected to erasing at the erasing section 30. Specifically, when at least a predetermined time elapses after erasing is conducted on the stimulable phosphor sheet 1, the sheet 1 stores energy of radiations emitted by radioactive isotopes such as $^{226}$Ra and $^{40}$K, which are contained in a trace amount in the stimulable phosphor, or energy of environmental radiations such as cosmic rays and X-rays emitted by other X-ray sources. These types of radiation energy undesirably stored on the sheet 1 cause noise in a radiation image recorded next on the sheet 1. In order to prevent noise generation, the sheet 1 is passed under the auxiliary erasing section 40 for conducting erasing (secondary erasing) by releasing the radiation energy stored on the sheet 1 while the sheet 1 is maintained at the sorter section 100. Therefore, the sheet 1 thus conveyed into the cassette 2 may be taken out of the read-out apparatus in the form housed in the cassette 2 and immediately used for image recording.

As mentioned above, the aforesaid embodiment is provided with the sorter section 100 capable of holding a plurality of the sheets 1, 1, . . . and for receiving the sheet 1 erased at the erasing section 30. Also, the sheet conveyance means 50 comprises the first conveyance system for receiving the sheet 1 from the cassette holding section 10, conveying the sheet 1 to the read-out section 20 and the erasing section 30, and then conveying the sheet 1 into the sorter section 100, and the second conveyance system for receiving the sheet 1 selected and taken out of the sorter section 100 and conveying it into the cassette 2 at the cassette holding section 10. Therefore, with this embodiment, it is possible to take a selected sheet 1 out of the sorter section 100 and convey it into the cassette 2 by the second conveyance system immediately when a sheet 1 is taken out of the cassette 2 at the cassette holding section 10. Accordingly, within a short time interval after the cassette 2 housing the sheet 1 carrying a radiation image stored thereon is fed to the cassette holding section 10, it is possible to take the cassette 2 loaded with a new sheet 1 out of the cassette holding section 10 and carry it to an external image recording apparatus for conducting image recording. Also, in the case where the size of the sheet 1 housed in the cassette 2 is different between the cassettes 2, 2, . . . , the sheets 1, 1, . . . having different sizes may in advance be loaded to the sorter section 100, and a sheet 1 suitable for the size of the cassette 2 fed to the cassette holding section 10 may be selected from the sorter section 100 and taken therefrom. Thus it is possible to circulate and reuse the sheets 1, 1, . . . efficiently regardless of the sizes thereof. In order to maintain the sheets 1, 1, . . . having different sizes in advance in the sorter section 100, they may be collected into the sorter section 100 without conducting sheet take-out therefrom for a while after the operation of the read-out apparatus is started, or unexposed sheets 1, 1, . . . having different sizes may be loaded into the sorter section 100 before the operation of the apparatus is started. In order to select a sheet 1 having a size suitable for the cassette 2 fed to the cassette holding section 10 and take it out of the sorter section 100, it is necessary to use a control means for memorizing the sizes of the sheets 1, 1, . . . housed in the trays 103, 103, . . . at the sorter section 100 and controlling the selection and taking-out of a sheet 1 having a size suitable for the cassette 2 fed to the cassette holding section 10. For this purpose, this embodiment is provided with a control section 90 disposed above the read-out section 20. The respective trays 103, 103, . . . may be determined in advance for the respective sizes of the sheets 1, 1, . . . housed therein, or may be used regardless of the sheet sizes.

On the other hand, in an external image recording apparatus, besides the image recording on the sheet 1 housed in the cassette 2, image recording may be conducted on a plurality of the sheets 1, 1, . . . taken one by one out of a sheet feed magazine for continuous image recording or the like. The sheets 1, 1, . . . carrying a radiation image stored thereon are sequentially housed in a sheet housing magazine, which is then sent to the read-out apparatus. The embodiment of the read-out apparatus shown in FIG. 1 is provided with a sheet housing magazine holding section 70 for releasably holding a sheet housing magazine 3 housing a plurality of the sheets 1, 1, . . . carrying a radiation image stored thereon, and a sheet feed magazine holding section 80 for releasably holding sheet feed magazines 4, 4 having different sizes and capable of housing a plurality of the erased sheets 1, 1, . . . , which can be reused so that image read-out and erasing can be conducted also for the sheets 1, 1, . . . housed in the sheet housing magazine 3 which houses image-recorded sheets.

Specifically, when the sheet housing magazine 3 is held at the sheet housing magazine holding section 70, the sheets 1, 1, . . . are taken one by one out of the sheet housing magazine 3 by a suction means 71 and transferred to the sheet conveyance means 50 provided in the vicinity of the sheet housing magazine holding section 70. The sheet conveyance means 50 conveys the sheet 1 in the direction as indicated by the arrow A15, and the conveyed sheet 1 enters the aforesaid first conveyance system and is conveyed in the direction as indicated by the arrow A3 at the read-out section 20 for conducting image read-out. After the image read-out is finished, the sheet 1 is conveyed in the directions as indicated by the arrows A5 and A6 into the erasing secton 30, where erasing is conducted by conveying the sheet 1 in the direction as indicated by the arrow A7. The sheet 1 is then conveyed in the directions as indicated by the arrows A8, A9 and A10 up to the position indicated by the broken line in FIG. 1. The sheet conveyance means 50 conveying the sheet 1 in the direction as indicated by the arrow A10 does not conduct switchback for the sheet 1 which should be conveyed into the sheet feed magazines 4, 4. The sheet 1 is further conveyed in the direction as indicated by the arrow A16 into one of the sheet feed magazines 4, 4. The sheet feed magazine holding section 80 holds the sheet feed magazines 4, 4 (two magazines in this example) having different sizes, and an endless belt 55 and a guide roller 56 at the end of the sheet conveyance means 50 are moveable between the positions indicated by the solid line and the broken line in accordance with the position of the sheet feed magazine 4 into which the sheet 1 should be conveyed. The sheet feed magazines 4, 4 housing the sheets 1, 1, . . . conveyed thereinto in accordance with the sheet sizes are taken out of the read-out apparatus and used for image recording.

In the case where the read-out apparatus is used for image read-out and erasing only for the sheet 1 subjected to image recording in the form housed in the cassette 2, the sheet housing magazine holding section 70 and the sheet feed magazine holding section 80 may be omitted to make the overall apparatus more compact. The arrangement of the cassette holding section 10, the read-out section 20, the erasing section 30 and the sorter section 100, and the configuration of the sorter section 100 or the like are not limited to those mentioned above.

Figure 6:
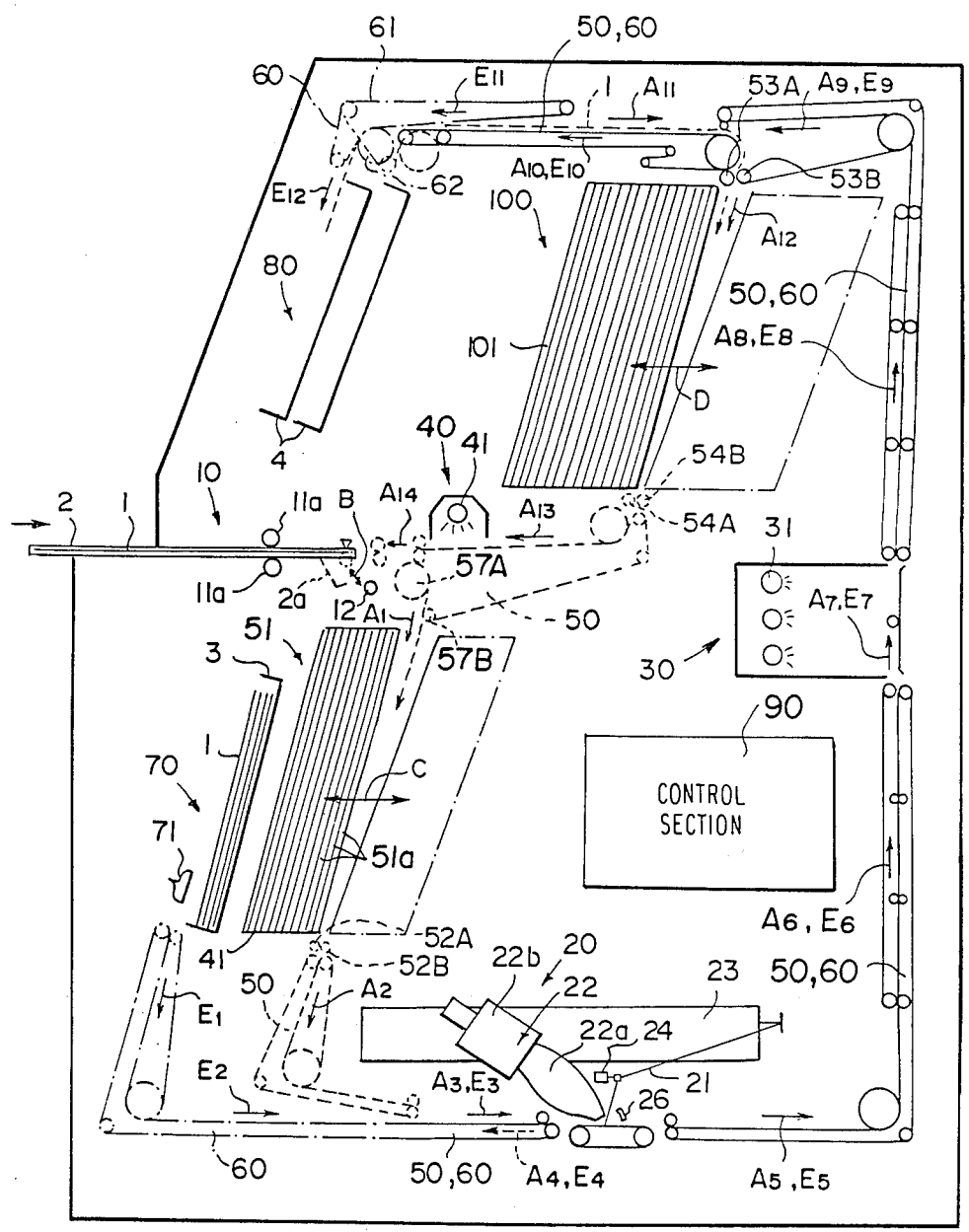
FIG. 6 is a schematic side view showing another embodiment of the radiation image read-out apparatus in accordance with the present invention.

FIG. 6 shows another embodiment of the radiation image read-out apparatus in accordance with the present invention. In FIG. 6, similar elements are numbered with the same reference numerals with respect to FIG. 1. This embodiment is provided with a cassette sheet conveyance means 50 for receiving the sheet 1 taken out of the cassette 2, conveying the sheet 1 to the read-out section 20 and the erasing section 30, and conveying the sheet 1 erased at the erasing section 30 to the cassette holding section 10 in the same manner as the sheet conveyance means 50 in the embodiment of FIG. 1. This embodiment is also provided with the sheet housing magazine holding section 70 and the sheet feed magazine holding section 80 as mentioned above, and a magazine sheet conveyance means 60 for conveying the sheet 1 taken out of the sheet housing magazine 3 to the read-out section 20 and the erasing section 30 and then into the sheet feed magazines 4, 4. A part of the cassette sheet conveyance means 50 and a part of the magazine sheet conveyance means 60 are common to each other. In FIG. 6, the portion common to the conveyance means 50 and 60 is indicated by the solid line, the other portions of the cassette sheet conveyance means 50 are indicated by the broken line, and the other portions of the magazine sheet conveyance means 60 are indicated by the chain line. The image read-out, erasing and conveyance of the sheet 1 fed to the read-out apparatus in the form housed in the cassette 2 are conducted in the same manner as described with reference to FIG. 1.

Figure 7:
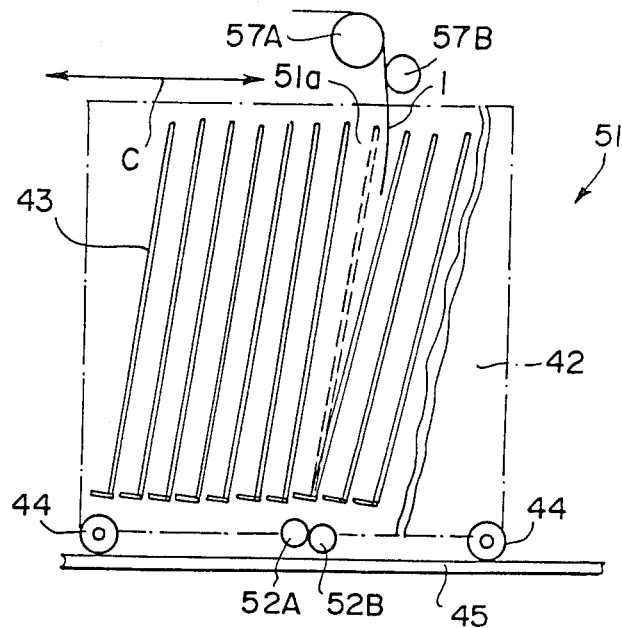
FIG. 7 is a schematic view showing the configuration of the stack section in the embodiment of FIG. 6.
Figure 8:
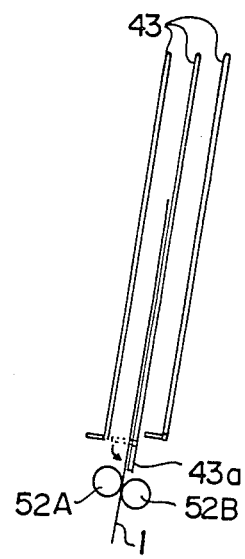
FIG. 8 is an explanatory view showing the sheet being taken out of the stack section of FIG. 7.

FIG. 7 shows the configuration of the stack section 51, and FIG. 8 shows the sheet take-out from the stack section 51. Reference numeral 42 denotes the case, reference numeral 43 denotes the tray, and reference numeral 43a denotes the bottom plate of the tray 43. Reference numeral 44 designates the wheel, and reference numeral 45 designates the rail. The stack section 51 is constituted in the same manner as the sorter section 100 in the embodiment of FIG. 1.

In the embodiment of FIG. 6, the second conveyance system of the cassette sheet conveyance means 50 may be constituted so that the sheet 1 is not conveyed into the sorter section 100 and the sheet 1 conveyed out of the erasing section 30 is directly conveyed into the cassette 2 at the cassette holding section 10.

In the embodiment of FIG. 6, after the image read-out and erasing are finished for the sheet 1 subjected to image recording in the form housed in the cassette 2, the sheet 1 is conveyed into the cassette 2 by the cassette sheet conveyance means 50. Therefore, the sheet 1 subjected to image recording in the form housed in the cassette 2 is always reused as the sheet for the cassette. On the other hand, the sheet housing magazine 3 housing the sheets 1, 1, . . . subjected to image recording by being taken one by one out of the sheet feed magazine in an external image recording section is fed to the sheet housing magazine holding section 70. Image read-out, erasing and conveyance in the read-out apparatus for the sheets 1, 1, . . . housed in the sheet housing magazine 3 will now be described below.

The sheet housing magazine holding section 70 is provided with the suction member 71 acting as a take-out means for taking the sheets 1, 1, . . . one by one out of the sheet housing magazine 3 fed to the sheet housing magazine holding section 70. The sheets 1, 1, . . . are taken by the suction member 71 one by one out of the sheet housing magazine 3, and transferred to the magazine sheet conveyance means 60 disposed in the vicinity of the sheet housing magazine holding section 70. The magazine sheet conveyance means 60 conveys the sheet 1 in the directions as indicated by the arrows E1 and E2. The magazine sheet conveyance means 60 becomes common to the cassette sheet conveyance means 50 from midway thereof. The sheet 1 is then conveyed by the portion of the magazine sheet conveyance means 60 common to the cassette sheet conveyance means 50 (said portion is indicated by the solid line in FIG. 6) in the direction as indicated by the arrow E3 through the read-out section 20, and subjected to image read-out. When the preliminary read-out is conducted for the sheet 1 prior to the final read-out, the preliminary read-out is conducted by conveying the sheet 1 in the direction as indicated by the arrow E3, the sheet 1 is then switched back in the direction as indicated by the arrow E4, and the final read-out is conducted by conveying the sheet 1 in the direction as indicated by the arrow E3 in the same manner as for the sheet 1 of the cassette 2. After image read-out is finished, the sheet 1 is conveyed in the directions as indicated by the arrows E5 and E6 into the erasing sectio 30, and erasing is conducted by conveying the sheet 1 in the direction as indicated by the arrow E7 in the erasing section 30. The sheet 1 is then conveyed in the directions as indicated by the arrows E8, E9 and E10 to the position indicated by the broken line. For the sheet 1 taken out of the sheet housing magazine 3, the magazine sheet conveyance means 60 conveying the sheet 1 in the direction as indicated by the arrow E10 directly conveys the sheet 1 in the direction as indicated by the arrow E11 without switching back the sheet 1. Thereafter, the magazine sheet conveyance means 60 conveys the sheet 1 in the direction as indicated by the arrow E12 into one of the sheet feed magazines 4, 4 held at the sheet feed magazine holding section 80.

The sheet feed magazine holding section 80 holds the sheet feed magazines 4, 4 (two magazines in this example) having different sizes and capable of housing a plurality of the sheets 1, 1, . . . . An endless belt 61 and a guide roller 62 provided at the end of the magazine sheet conveyance means 60 are moveable in accordance with the size of the sheet 1 between the positions indicated by the solid line and the broken line so that the sheet 1 is introduced into either one of the sheet feed magazines 4, 4 having the size suitable for the sheet 1. The sheet feed magazine 4 loaded with the sheets 1, 1, . . . conveyed thereinto in accordance with the sheet size is taken out of the read-out apparatus and used for image recording. Thus with this embodiment, since the sheet 1 which was subjected to image recording by being taken out of the sheet feed magazine is housed in the sheet housing magazine 3, fed to the read-out apparatus in this form, conveyed by the magazine sheet conveyance means 60 to conduct image read-out and erasing, and then housed in the sheet feed magazine 4, said sheet 1 is always reused as the sheet for the magazine. Accordingly, with this embodiment, it is possible to use the sheets 1, 1, . . . repeatedly by always discriminating between the sheet 1 for the cassette and the sheet 1 for the magazine.

Though a part of the cassette sheet conveyance means 50 and a part of the magazine sheet conveyance means 60 are common to each other in the embodiment of FIG. 6, only the portions where the sheet 1 passes through the read-out section 20 and the erasing section 30 may be made common, and the other portions of the conveyance means 50 and 60 may be independent of each other.

Figure 9:
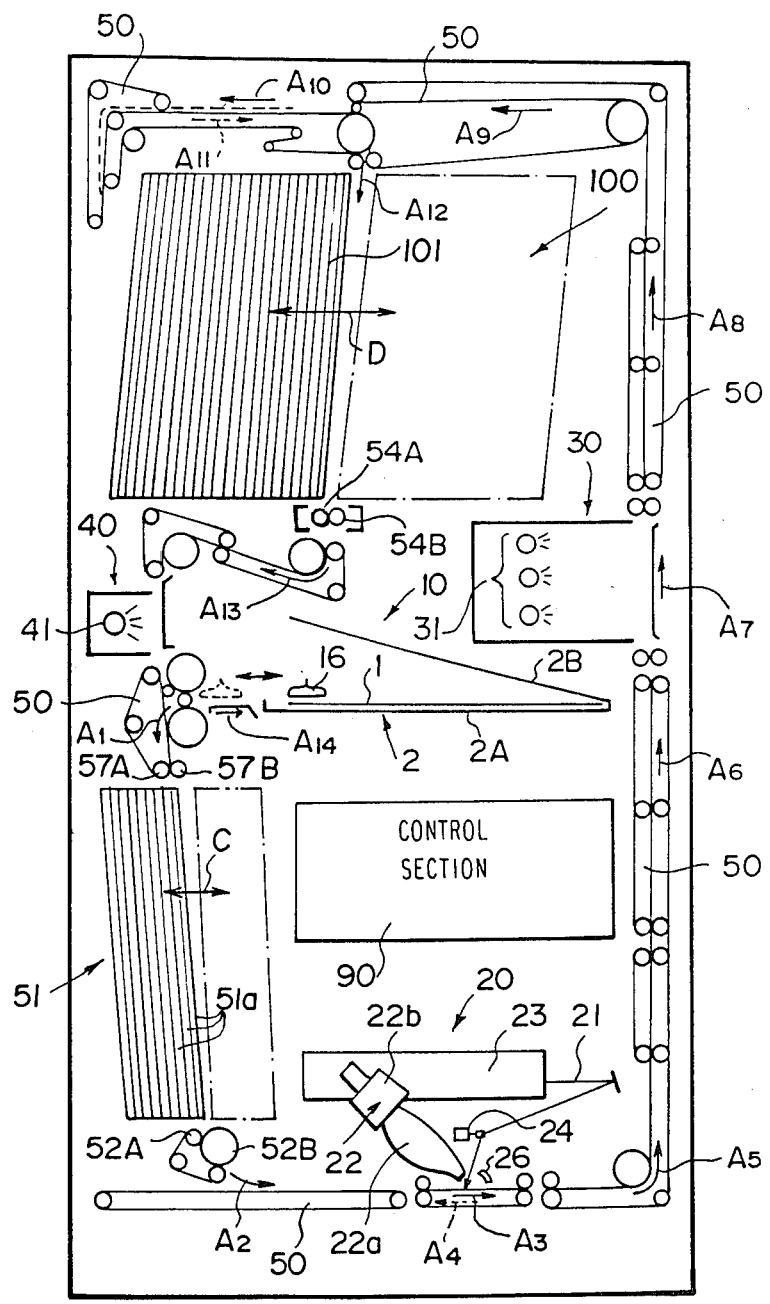
FIG. 9 is a schematic side view showing a further embodiment of the radiation image read-out apparatus in accordance with the present invention.

FIG. 9 shows a further embodiment of the radiation image read-out apparatus in accordance with the present invention. In FIG. 9, similar elements are numbered with he same reference numerals with respect to FIG. 1 (this applies also to the subsequent drawings). In this embodiment, the sheet conveyance means 50 is constituted to convey the stimulable phosphor sheet 1 along an approximately loop-like conveyance path for the purpose of receiving the sheet 1 taken out of the cassette 2, conveying the sheet 1 to the read-out section 20 and the erasing section 30 in this order, and conveying the sheet 1 erased at the erasing section 30 to the cassette holding section 10. The cassette holding section 10 is provided at a position inward of the approximately loop-like conveying path of the sheet conveyance means 50. The cassette 2 comprises a cassette main body 2A for holding the sheet 1 and an openable cover portion 2B. The sheet 1 is housed in the cassette 2 with the stimulable phosphor layer facing down. Cassette opening/closing at the cassette holding section 10 will hereinbelow be described with reference to FIG. 10.

Figure 10:
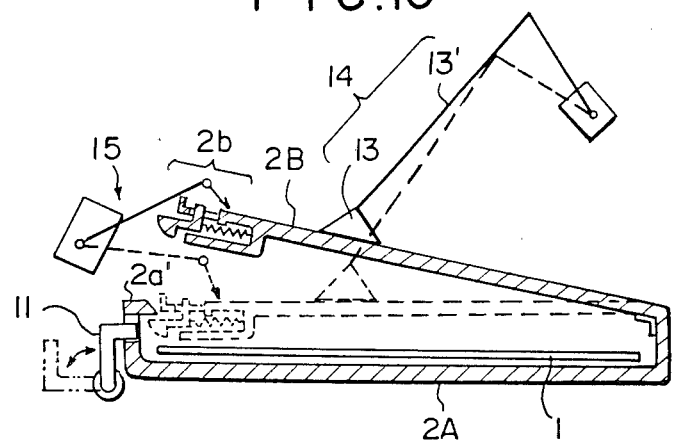
FIG. 10 is a schematic view showing the opening and closing mechanism for the cassette in the embodiment of FIG. 9.

In FIG. 10, the cover portion 2B of the cassette 2 is provided with a lock mechanism 2b for locking the cover portion 2B in the closed condition to the cassette main body 2A by being urged by a spring. The cassette holding section 10 is provided therein with a lock release claw 11 rotated by a rotary solenoid or the like between a first position indicated by the chain line and a second position indicated by the solid line. When the cassette 2 is fed to the cassette holding section 10 with the cover portion 2B in the locked condition, the lock release claw 11 is rotated from the first position to the second position, and pushes the lock mechanism 2b to release the lock of the cover portion 2B.

The cassette holding section 10 is also provided therein with an urging means 15 for urging the cover portion 2B toward the closed position, and a cover portion opening and closing means 14 comprising a swing arm 13' and a suction means 13. When the lock of the cover portion 2B is released as mentioned above, the suction means 13 sucks the cover portion 2B, and the swing arm 13' is moved from the position indicated by the broken line to the position indicated by the solid line, thereby to open the cover portion 2B against the urging force of the urging means 15. As shown in FIG. 9, when the cover portion 2B is opened in this manner, a suction cup 16 provided as the sheet take-out means is moved into the cassette 2, takes the sheet 1 out of the cassette 2 by suction, and transfers it to the sheet conveyance means 50 in the vicinity of the suction cup 16. When an erased sheet 1 is conveyed into the cassette 2 and the cassette 2 should be taken out of the cassette holding section 10, the cover portion opening and closing means 14 is moved to the position indicated by the broken line in FIG. 10, and closes the cover portion 2B. Since the cover portion 2B is urged by the urging means 15, the lock mechanism 2b engages with a protrusion 2a' of the cassette main body 2A, and locks the cover portion 2B in the closed position.

In the embodiment of FIG. 9, after the sheet 1 is ejected from the sorter section 100, the sheet 1 is conveyed by the sheet conveyance means 50 in the direction as indicated by the arrow A13, passed over the auxiliary erasing section 40, and further conveyed in the direction as indicated by the arrow A14 into the cassette 2. After the rear end of the sheet 1 conveyed into the cassette 2 leaves the sheet conveyance means 50, the sheet may be completely introduced into the cassette 2 by being sucked by the suction cup 16.

The embodiment of FIG. 9 may be modified so that the sheet 1 conveyed out of the erasing section 30 is directly conveyed into the cassette 2. Thus the sorter section 100 and the auxiliary erasing section 40 may be omitted to make the apparatus smaller.

Figure 11:
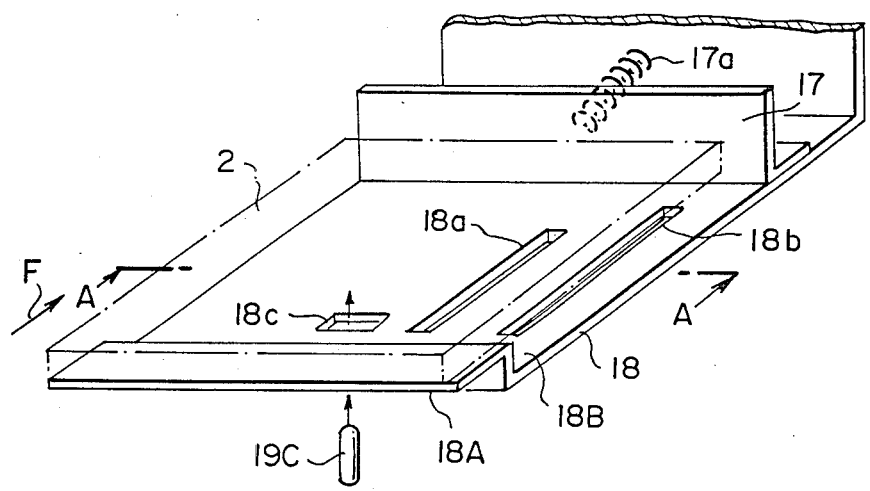
FIG. 11 is a perspective view showing the configuration of the cassette holding section.

In the embodiment of FIG. 9, the sheet conveyance means 50 for conveying the sheet 1 taken out of the cassette 2 to the read-out section 20 and the erasing section 30 and thereafter conveying the sheet 1 after the image read-out and erasing into the cassette 2 is constituted to convey the sheet 1 along an approximately loop-like conveyance path. The cassette holding section 10 for releasably holding the cassette 2 is provided at a position inward of the approximately loop-like conveyance path. Therefore, the cassette holding section 10 does not project out of the sheet conveyance means, and the apparatus becomes small. Also, since the cassette holding section 10 is provided at a position inward of the sheet conveyance path, the cassette 2 is fed to the cassette holding section 10 in a direction lateral with respect to the approximately loop-like conveyance path, i.e. at an angle normal to the drawing sheet in FIG. 9, without interfering with the conveyance path. An example of feeding and unloading of the cassette 2 at the cassette holding section 10 will now be described with reference to FIGS. 11 and 12.

Figure 12:
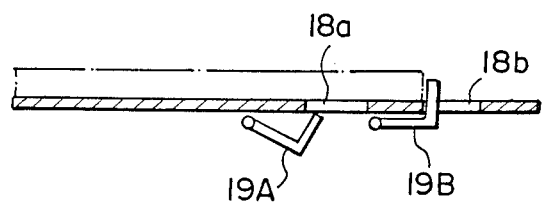
FIG. 12 is a sectional view taken along line A—A of FIG. 11.

The cassette 2 is inserted into the cassette holding section 10 in the direction as indicated by the arrow F along a guide portion 18A of a holding base 18. The holding base 18 is provided with a step-like portion 18B lowered with respect to the guide portion 18A, and a shifting plate 17 slideable on the step-like portion 18B and urged by a spring 17a reversely to the inserting direction of the cassette 2 is provided on the step-like portion 18B. The cassette 2 advances onto the holding base 18 by pushing the shifting plate 17 in the inserting direction against the urging force of the spring 17a, and falls onto the step-like portion 18B when the rear end of the cassette 2 as viewed in the inserting direction arrives at the step-like portion 18B, and the position of the cassette 2 in the inserting direction is adjusted by being urged by the shifting plate 17. The step-like portion 18B is provided with a plurality of slits 18a and 18b extending in the inserting direction of the cassette 2. As shown in FIG. 12 which is a sectional view taken along line A—A of FIG. 11, position adjusting plates 19A and 19B rotatable between a first position projecting above the slits 18a and 18b and a second position retracting under the slits are provided under the slits 18a and 18b. The slits 18a and 18b and the position adjusting plates 19A and 19B are disposed at positions corresponding to the widths of cassettes having different sizes, which may be fed to the cassette holding section 10. Either one of the position adjusting plates 19A and 19B corresponding to the size of the cassette 2 fed to the cassette holding section 10 is moved to the first position and adjusts the position of the cassette 2. After the position of the cassette 2 is adjusted in two directions on the step-like portion 18B, the cassette 2 is opened as mentioned above, and the sheet 1 is taken thereout. On the other hand, the step-like portion 18B is provided with a hole 18c in the vicinity of the guide portion 18A. When the cassette 2 is taken out of the cassette holding section 10, a pin 19C is inserted into the hole 18c to push up the end portion of the cassette 2. When the end portion of the cassette 2 is pushed up to the height of the guide portion 18A, and cassette 2 is ejected out of the cassette holding section 10 by the urging force of the shifting plate 17.

The aforesaid cassette feeding/unloading mechanism is a mere example, and any other means may be used for feeding and unloading the cassette 2 at the cassette holding section 10. Also, the cassette 2 may be inserted in slightly oblique direction into the cassette holding section 10 insofar as it does not interfere with the conveyance path.

FIG. 13 shows a still further embodiment of the radiation image read-out apparatus in accordance with the present invention. In FIG. 13, similar elements are numbered with the same reference numerals with respect to FIG. 1, except that the arrows A1 through A16 indicating the directions of sheet conveyance are numbered differently. In this embodiment, the sheet 1 taken out of the cassette 2 is conveyed by the sheet conveyance means 50 in the direction as indicated by the arrow A1. A moveable conveyance section 58 constituting a part of the sheet conveyance means 50 and moveable in the direction as indicated by the arrow G1 between a first position indicated by the chain line and a second position indicated by the solid line is provided in the advancing direction of the sheet 1. The sheet 1 conveyed in the direction as indicated by the arrow A1 is then conveyed by the moveable conveyance section 58 at the first position in the direction as indicated by the arrow A2. When the leading end of the sheet 1 conveyed in the direction as indicated by the arrow A2 arrives at a roller 58A at the end of the moveable conveyance section 58, the moveable conveyance section 58 is moved to the second position, and switches back the sheet 1 in the direction as indicated by the arrow A3. The sheet 1 is then conveyed in the direction as indicated by the arrow A4 by the sheet conveyance means 50 into the stack section 51.

In the embodiment of FIG. 13, the sheet 1 ejected from the sorter section 100 is conveyed by the sheet conveyance means 50 in the direction as indicated by the arrow A15, and made to pass over the auxiliary erasing section 40. For erasing at the auxiliary erasing section 40, the erasing light source 31 of the erasing section 30 is utilized. Specifically, the sheet conveyance means 50 is provided so that the sheet 1 passes over the erasing section 30 and the auxiliary erasing section 40 at different positions around the erasing light source 31. Thus the erasing section 30 and the auxiliary erasing section 40 are provided at different positions so that they utilize the same erasing light source 31. The sheet 1 subjected to secondary erasing at the auxiliary erasing section 40 is conveyed in the direction as indicated by the arrow A16 into the empty cassette 2 held at the cassette holding section 10. In this embodiment, since the same erasing light source is utilized for the primary erasing and the secondary erasing, it is possible to prevent the apparatus from becoming large, complicated in configuration and expensive due to the provision of the auxiliary erasing section 40.

Though this embodiment is provided with the sorter section 100 as mentioned above, the sorter section 100 may be replaced by a sheet stacking section of any other configuration insofar as a plurality of the sheets 1, 1, . . . can be housed and selectively taken out one by one.

Accordingly, the embodiment of FIG. 13 may be constituted so that a sheet 1 which has not been erased sufficiently is conveyed from the sorter section 100 to the erasing section 30 when the erasing section 30 is not busy. For this purpose, the sheet conveyance means 50 is provided with an erasing conveyance section for directly conveying the sheet 1 ejected out of the sorter section 100 to the erasing section 30. Erasing of the sheet 1 by use of the erasing conveyance section will now be described with reference to FIG. 15 which is an enlarged view showing a part of FIG. 13.

In the case where the read-out conditions are the same, the level of radiation energy remaining on the sheet 1 after image read-out is proportional to the level of radiation energy stored on the sheet 1 at the time of image recording. Therefore, when the image recording conditions such as the image recording portion of the object and the image recording method are known for each sheet 1, it is possible to estimate the level of residual radiation energy. The level of residual radiation energy may also be estimated on the basis of the information obtained by the preliminary read-out. When a sheet 1 is judged to store a high level of residual radiation energy, the sheet 1 is conveyed into the sorter section 100 after the first erasing at the erasing section 30, and conveyed from the sorter section 100 to the erasing section 30 when the erasing section 30 is not busy.

Specifically, the sheet 1 which should further be erased and which is ejected out of the sorter section 100 is conveyed through the auxiliary erasing section 40 in the direction as indicated by the arrow A15 (in this case, the erasing light source 31 may be turned on or off), and then conveyed in the direction as indicated by the arrow A17 by a second moveable conveyance section 59 having a roller 59A at the position indicated by the broken line. The roller 59A of the second moveable conveyance section 59 is projected outwardly to the first position indicated by the solid line when the conveyed sheet 1 should be introduced into the cassette 2, and is retracted to the second position indicated by the broken line when the sheet 1 should be sent to the erasing section 30. When the second moveable conveyance section 56 is shifted to the second position, the roller 58B of the first moveable conveyance section 58 is moved in the direction as indicated by the arrow G2, and the first moveable conveyance section 58 is moved to a third position indicated by the broken line above the first and second positions, which are indicated respectively by the solid line and the chain line in FIG. 15, and contacts the second moveable conveyance section 59. In this embodiment, the erasing conveyance section is constituted by the second moveable conveyance section 59 at its second position and the first moveable conveyance section 58 at its third position. The sheet 1 is conveyed by the erasing conveyance section in the directions as indicated by the arrows A17 and A18, and further conveyed by the sheet conveyance means 50 in the direction as indicated by the arrow A19 to the erasing section 30. When the second erasing is finished at the erasing section 30, the sheet 1 is conveyed by the sheet conveyance means 50 to the sorter section 100 in the same manner as after the first erasing. In the case where the erasing is still insufficient after the second erasing, the sheet 1 may further be passed through the erasing section 30.

Figure 14:
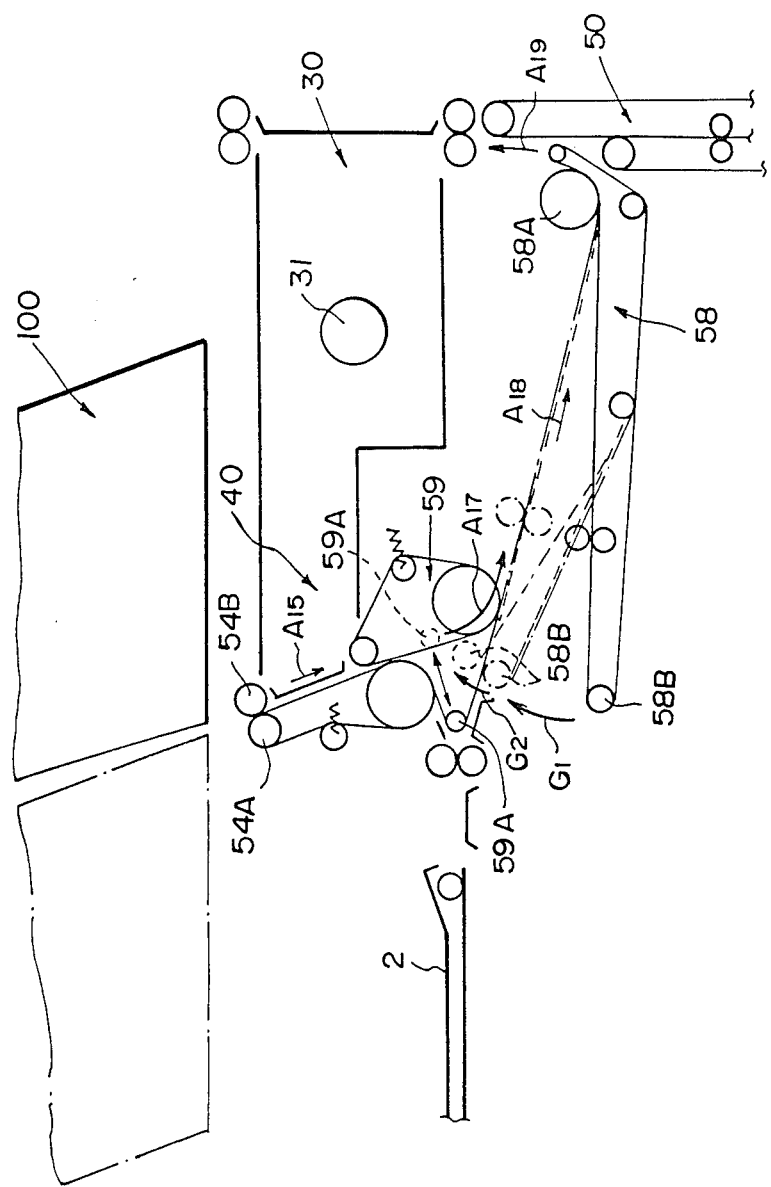
FIG. 14 is an enlarged view showing a part of the embodiment of FIG. 13.

With the embodiment of FIG. 14, it is possible to take only the sheets 1, 1, . . . on which the erasing was insufficient out of the sorter section 100, and to send them immediately to the erasing section 30 by the erasing conveyance section for conducting second erasing and subsequent erasing. Therefore, it is possible to convey every sheet 1 at a speed suitable for a sheet 1, on which the level of residual radiation energy is low, when conducting the first erasing at the erasing section 30, thereby preventing the sheet processing speed from becoming low. Also it is possible to conduct erasing substantially in accordance with the level of residual radiation energy for every sheet 1. Besides the erasing of residual radiation energy, all of the sheets 1, 1, ... housed in the sorter section 100 may be sent to the erasing section 30 by the erasing conveyance section when a predetermined time has elapsed after the sheets are sent to the sorter section 100. In this case, it becomes possible to conduct secondary erasing periodically and to omit the auxiliary erasing section 40.

We claim:

1. A radiation image read-out apparatus for removing a stimulable phosphor sheet from one of at least a first openable cassette and a second openable cassette for housing said stimulable phosphor sheet, said stimulable phosphor sheet having a radiation image recorded thereon, reading out the radiation image from said sheet, erasing any radiation energy remaining on said sheet after said radiation image is read-out therefrom, then conveying said sheet into one or the other of said first and second openable cassettes, said read-out apparatus comprising:
   (i) a read-out section (20) for reading out said radiation image stored on a stimulable phosphor sheet (1);
   (ii) an erasing section (30) for erasing said radiation energy remaining on said stimulable phosphor sheet after image read-out from said stimulable phosphor sheet is finished,
   (iii) a cassette holding section (10) for holding the one of said first and second openable cassettes, the one of said cassettes being removable from said holding section and replaceable with the other of said first and second openable cassettes, and said holding section being provided with a take-out means for taking said stimulable phosphor sheet out of the one of said first and second openable cassettes being held at said holding section,
   (iv) a sorter section (100) for holding a plurality of the stimulable phosphor sheets, said sorter section receiving said stimulable phosphor sheet after erasing is conducted thereon at said erasing section and selectively conveying the stimulable phosphor sheets one by one out of said sorter section, and
   (v) a sheet conveyance means constituted by a first conveyance system for receiving said stimulable phosphor sheet conveyed from said cassette holding section, conveying said stimulable phosphor sheet to said read-out section and said erasing section, and then conveying said stimulable phosphor sheet into said sorter section, and a second conveyance system for receiving said stimulable phosphor sheet conveyed out of said sorter section and conveying said stimulable phosphor sheet into one or the other of said first and second openable cassettes held at said cassette holding section.

2. An apparatus as defined in claim 1 wherein said first conveyance system comprises a stack section disposed between said cassette holding section and said read-out section for temporarily housing said stimulable phosphor sheet conveyed out of said cassette holding section.

3. An apparatus as defined in claim 2 wherein said stack section comprises a plurality of trays disposed parallel to each other in equally spaced relation in a case, a guide member for widening the space of either one of said trays when said stimulable phosphor sheet is introduced into said tray, and a means for moving said case housing said trays.

4. An apparatus as defined in claim 3 wherein said guide member is connected to a swing arm for making said guide member enter into said space of said tray to widen said space and push a side end of said stimulable phosphor sheet conveyed into said tray, see as to adjust the position of said stimulable phosphor sheet in said tray.

5. An apparatus as defined in claim 1 wherein said sorter section comprises a plurality of trays disposed parallel to each other in equally spaced relation in a case, a guide member for widening the space of either one of said trays when said stimulable phosphor sheet is introduced into said tray, and a means for moving said case housing said trays.

6. An apparatus as defined in claim 4 wherein said guide member is connected to a swing arm for making said guide member enter into said space of said tray to widen said space and push a side end of said stimulable phosphor sheet conveyed into said tray, so as to adjust the position of said stimulable phosphor sheet in said tray.

7. An apparatus as defined in claim 1 wherein an auxiliary erasing section is disposed at said second conveyance system.

8. An apparatus as defined in claim 7 wherein said erasing section and said auxiliary erasing section disposed at positions different from each other utilize a common erasing light source.

9. An apparatus as defined in claim 8 wherein said sorter section comprises a plurality of trays disposed parallel to each other in equally spaced relation in a case, a guide member for widening the space of either one of said trays when said stimulable phosphor sheet is introduced into said tray, and a means for moving said case housing said trays.

10. An apparatus as defined in claim 9 wherein said guide member is connected to a swing arm for making said guide member enter into said space of said tray to widen said space and push a side end of said stimulable phosphor sheet conveyed into said tray, so as to adjust the position of said stimulable phosphor sheet in said tray.

11. An apparatus as defined in claim 8 wherein said sorter section comprises a plurality of trays for respectively housing a plurality of said stimulable phosphor sheets, and said first conveyance system is provided with a moveable conveyance section for moving to either one of said trays and conveying said stimulable phosphor sheet into it.

12. An apparatus as defined in claim 1 wherein said second conveyance system is provided with an erasing conveyance section for conveying said stimulable phosphor sheet conveyed out of said sorter section to said erasing section, and is constituted to convey said stimulable phosphor sheet conveyed out of said sorter section either to said cassette holding section or to said erasing section.

13. A radiation image read-out apparatus for removing a stimulable phosphor sheet from one of at least a first openable cassette and a second openable cassette for housing said stimulable phosphor sheet, said stimulable phosphor sheet having a radiation image recorded thereon, reading out the radiation image from said sheet, erasing any radiation energy remaining on said sheet after said radiation image is read-out therefrom, and then conveying said sheet into one of said first and second openable cassettes, said read-out apparatus comprising:

(i) a read-out section (20) for reading out a radiation image stored on a stimulable phosphor sheet, (ii) an erasng section (30) for erasing radiation energy remaining on said stimulable phosphor sheet after image read-out from said stimulable phosphor sheet is finished, (iii) a cassette holding section (10) for holding the one of said first and second openable cassettes, the one of said openable cassettes being removable from said holding section and replaceable with the other of said openable cassettes, and said holding section being provided with a take-out means for taking said stimulable phosphor sheet out of the one of said first and second openable cassettes;

(iv) a sheet housing magazine holding section (70) for releasably holding a sheet housing magazine capable of housing a plurality of image-recorded stimulable phosphor sheets therein, and provided with a take-out means for taking said stimulable phosphor sheets one by one out of said sheet housing magazine, (v) a sheet feed magazine holding section (80) for releasably holding a sheet feed magazine capable of housing a plurality of erased reusable stimulable phosphor sheets, (vi) a cassette sheet conveyance means constituted by a first conveyance system for receiving said stimulable phosphor sheet taken out of said cassette and conveying said stimulable phosphor sheet to said read-out section and said erasing section, and a second conveyance system for conveying said stimulable phosphor sheet from said erasing section to the one or the other of said first and said second openable cassettes at said cassette holding section, and (vii) a magazine sheet conveyance means (60) for receiving said stimulable phosphor sheet taken out of said sheet housing magazine, conveying said stimulable phosphor sheet to said read-out section and said erasing section, and thereafter conveying said stimulable phosphor sheet into said sheet feed magazine.

14. An apparatus as defined in claim 13 wherein said second conveyance means of said cassette sheet conveyance means is provided with a sorter section for holding a plurality of the stimulable phosphor sheets, said sorter section receiving said stimulable phosphor sheet after erasing is conducted thereon at said erasing section and conveying the stimulable phosphor sheets one by one out of said sorter section towards said cassette.

15. An apparatus as defined in claim 14 wherein said sorter section comprises a plurality of trays disposed parallel to each other in equally spaced relation in a case, and a means for moving said case housing said trays.

16. An apparatus as defined in claim 14 wherein said second conveyance means of said cassette sheet conveyance means is provided with an auxiliary erasing section disposed between said sorter section and said cassette holding section.

17. An apparatus as defined in claim 13 wherein said first conveyance system of said cassette sheet conveyance means comprises a stack section disposed between said cassette holding section and said read-out section for temporarily housing said stimulable phosphor sheet conveyed out of said cassette holding section.

18. An apparatus as defined in claim 17 wherein said stack section comprises a plurality of trays disposed parallel to each other in equally spaced relation in a case, and a means for moving said case housing said trays.

19. A radiation image read-out apparatus for removing a stimulable phosphor sheet from one of at least a first openable cassette and a second openable cassette for housing said stimulable phosphor sheet, said stimulable phosphor sheet having a radiation image recorded thereon, reading out the radiation image from said sheet, erasing any radiation energy remaining on said sheet after said radiation image is read-out therefrom, and then conveying said sheeet into one or the other of said first and second openable cassettes, said read-out apparatus comprising:

(i) a read-out section for reading out a radiation image stored on a stimulable phosphor sheet, (ii) an erasing section for erasing radiation energy remaining on said stimulable phosphor sheet after image read-out from said stimulable phosphor sheet is finished, (iii) a cassette holding section for holding the one of said first and second openable cassettes, the one of said openable cassettes being removable from said holding section and replaceable with the other of said openable cassettes, and said holding section being provided with a take-out means for taking said stimulable phosphor sheet out of the one of said first and second openable cassettes, and (iv) a sheet conveyance means for conveying said stimulable phosphor sheet along an approximately loop-like conveyance path for the purpose of receiving said stimulable phosphor sheet conveyed from said cassette holding section, conveying said stimulable phosphor sheet to said read-out section and said erasing section in this order, and then conveying said stimulable phosphor sheet passing through said erasing section into the one or the other of said first and second openable cassettes held at said cassette holding section, said cassette holding section being provided at a position inward of said approximately loop-like conveyance path of said sheet conveyance means.

20. An apparatus as defined in claim 19 wherein said cassette holding section is provided with an urging means for urging a cover portion of said cassette towards the closed position, and a cover portion opening and closing means comprising a swing arm and a suction means secured to said swing arm.

21. An apparatus as defined in claim 20 wherein said cover portion of said cassette is provided with a lock mechanism for locking said cover portion to a main body of said cassette, and said cassette holding section is provided with a lock release claw for releasing the lock of said cover portion.

22. An apparatus as defined in claim 19 wherein said cassette holding section is provided with a holding base comprising a guide portion for guiding said cassette, a steplike portion lower than said guide portion and provided with a means for adjusting the position of said cassette on said step-like portion, and a means for raising an end of said cassette from said step-like portion to said guide portion.

23. In a radiation image read-out apparatus for reading out a radiation image stored in a stimulable phosphor sheet, a stacker provided in a path of a sheet conveyance means of the apparatus for holding therein a plurality of stimulable phosphor sheets and discharging the same one by one, said stacker comprising:

- a tray unit composed of a casing and a plurality of trays disposed in said casing for holding said sheets respectively in equally spaced and parallel relation to each other in a supported position,
- a feed-in means provided above said tray unit for feeding said sheets fed by said sheet conveyance means into said tray unit,
- a feed-out means provided under the tray unit for receiving the sheets discharged out of said tray unit and conveying the sheets into said sheet conveyance means, and
- a moving means for moving said tray unit so that every tray in said casing can be brought under said feed-in means and above said feed-out means,
- each of said trays comprising a supporting plate for guiding said sheet fed-in by said feed-in means and supporting the fed-in sheet, and a bottom plate provided at the lower end of said supporting plate moveable between a first position to receive the lower end of said sheet and hold the sheet in the tray and a second position rotated downward from the first position to allow the sheet to fall by its weight and discharge it out of the tray unit.

24. In a radiation image read-out apparatus for reading out a radiation image stored in a stimulable phosphor sheet, a stacker provided in a path of a sheet conveyance means of the apparatus for holding therein a plurality of stimulable phosphor sheets and discharging the same one by one, said stacker comprising:

- a tray unit composed of a casing and a plurality of trays disposed in said casing for holding said sheets respectively in equally spaced and parallel relation to each other in a supported position,
- a feed-in means provided above said tray unit for feeding said sheets fed by said sheet conveyance means into said tray unit,
- a feed-out means provided under the tray unit for receiving the sheets discharged out of said tray unit and conveying the sheets into said sheet conveyance means,
- a moving means for moving said tray unit so that every tray in said casing can be brought under said feed-in means and above said feed-out means, and
- a wedge-shape guide member provided beside the tray located under said feed-in means and moveable into said tray for changing the angle of inclination of the tray to enlarge the space between the tray and an adjacent tray to facilitate feed-in of the sheet,
- each of said trays comprising a supporting plate obliquely positioned for guiding said sheet fed-in by said feed-in means and supporting the fed-in sheet, and a bottom plate provided at the lower end of said supporting plate moveable between a first position to receive the lower end of said sheet and hold the sheet in the tray and a second position rotated downward from the first position to allow the sheet to fall by its weight and discharge it out of the tray unit.

25. A stacker as defined in claim 24 wherein said wedge-shape guide member is controlled of its depth of insertion into the tray according to the size of the sheet fed into the tray for guiding and positioning the fed-in sheet in the lateral direction.

26. A radiation image read-out apparatus, comprising;
- a cassette holding section for receiving and holding an openable cassette;
- means within said holding section for removing a stimulable phosphor sheet from said cassette to empty said cassette;
- a read-out section for reading out a radiation image stored on said stimulable phosphor sheet;
- an erasing section for erasing any radiation energy remaining on said stimulable phosphor sheet after image read-out from said stimulable phosphor sheet has been completed;
- a sorter section for receiving stimulable phosphor sheets outputted by said erasing section, and including means for selectively forwarding stimulable phosphor sheets one-by-one to an output thereof;
- first sheet conveying means for receiving a stimulable phosphor sheet from said cassette holding section, for conveying said stimulable phosphor sheet to said read-out section and said erasing section, and for then conveying said stimulable phosphor sheet to said sorter section; and
- second sheet conveying means for receiving a selected stimulable phosphor sheet from the output of said sorter section and conveying this stimulable phosphor sheet into the empty cassette then present in said cassette holding section.

27. A radiation image read-out apparatus, comprising;
- a cassette holding section for receiving and holding an openable cassette;
- means within said holding section for removing a stimulable phosphor sheet from said cassette to empty said csssette;
- a read-out section for reading out a radiation image stored on said stimulable phosphor sheet;
- an erasing section for erasing any radiation energy remaining on said stimulable phosphor sheet after image read-out from said stimulable phosphor sheet has been completed;
- a sorter section for receiving stimulable phosphor sheets outputted by said erasing section, and including means for selectively forwarding stimulable phosphor sheets one-by-one to an output thereof;
- a sheet housing magazine holding section for releasably holding a sheet housing magazine capable of housing a plurality of stimulable phosphor sheets having images recorded therein, and provided with a take-out means for taking said stimulable phosphor sheets one by one out of said sheet housing magazine,
- a sheet feed magazine holding section for releasably holding a sheet feed magazine capable of housing a plurality of erased reusable stimulable phosphor sheets,
- first conveyance means for receiving said stimulable phosphor sheet taken out of said cassette at said cassette holding section, and for conveying said stimulable phosphor sheet to said read-out section, and for then conveying said stimulable phosphor sheet to said erasing section,
- second conveyance means for conveying said stimulable phosphor sheet from said erasing section into the empty cassette then present in said cassette holding section, and
- a magazine sheet conveyance means for receiving said stimulable phosphor sheet taken out of said sheet housing magazine, for conveying said stimulable phosphor sheet to said read-out section, for then conveying said stimulable phosphor sheet to said erasing section, and for thereafter conveying said stimulable phosphor sheet into said sheet feed magazine.

28. A radiation image read-out apparatus, comprising;

a cassette holding section for receiving and holding an openable cassette;

means within said holding section for removing a stimulable phosphor sheet from said cassette to empty said cassette;

a read-out section for reading out a radiation image stored on said stimulable phosphor sheet;

an erasing section for erasing any radiation energy remaining on said stimulable phosphor sheet after image read-out from said stimulable phosphor sheet has been completed;

a sheet conveyance means for conveying said stimulable phosphor sheet along an approximately loop-like conveyance path for receiving said stimulable phosphor sheet from said cassette holding section, for then conveying said stimulable phosphor sheet to said read-out section and said erasing section in this order, and for thereafter conveying said stimulable phosphor sheet into the empty cassette at said cassette holding section, said cassette holding section being provided at a position inward of said approximately loop-like conveyance path of said sheet conveyance means.

* * * * *